(12) United States Patent
Achrekar (10) Patent No.: US 10,580,590 B2
(45) Date of Patent: Mar. 3, 2020

(54) HIGH-CAPACITY ELECTRICAL ENERGY STORAGE DEVICE FOR USE IN ELECTRIC AND HYBRID ELECTRIC VEHICLES

(71) Applicant: Prakash Achrekar, Laguna Woods, CA (US)

(72) Inventor: Prakash Achrekar, Laguna Woods, CA (US)

(*) Notice: Subject to any disclaimer, the term of this patent is extended or adjusted under 35 U.S.C. 154(b) by 0 days.

(21) Appl. No.: 16/438,395

(22) Filed: Jun. 11, 2019

(65) Prior Publication Data
US 2019/0362907 A1    Nov. 28, 2019

Related U.S. Application Data

(63) Continuation of application No. 14/082,141, filed on Nov. 16, 2013, now Pat. No. 10,319,536.

(60) Provisional application No. 61/796,719, filed on Nov. 19, 2012.

(51) Int. Cl.
*H02J 7/00* (2006.01)
*H01G 11/08* (2013.01)
*H01G 11/22* (2013.01)

(52) U.S. Cl.
CPC ............. *H01G 11/08* (2013.01); *H01G 11/22* (2013.01)

(58) Field of Classification Search
USPC ................. 320/128, 136, 162, 101, 118, 112
See application file for complete search history.

(56) References Cited

U.S. PATENT DOCUMENTS

| 3,932,797 | A * | 1/1976 | York ............... G01R 19/16542 320/136 |
| 6,208,502 | B1 * | 3/2001 | Hudis .................... H01G 9/035 361/502 |
| 6,628,572 | B1 * | 9/2003 | Yabe ....................... G04C 10/00 320/128 |
| 7,541,782 | B2 * | 6/2009 | Narendra ................. H01C 3/20 320/162 |
| 2005/0282067 | A1 * | 12/2005 | Gutkin .................... H01G 9/038 429/122 |
| 2007/0262746 | A1 * | 11/2007 | Kang ..................... H01M 16/00 320/112 |
| 2008/0089012 | A1 * | 4/2008 | Kon ........................ H01G 11/24 361/502 |

(Continued)

*Primary Examiner* — Brian Ngo
(74) *Attorney, Agent, or Firm* — Jeffrey C. Wilk (57) ABSTRACT

A high-capacity electrical energy storage device (HCEESD) comprising a capacitor having at least one power cell, a pair of high-voltage main power terminals configured to receive and store electrical energy from an external main power source, and a pair of fixating auxiliary power terminals configured to receive a fixating voltage from an auxiliary power source that causes the stored electrical energy to be retained so long as the auxiliary power source remains active. The HCEESD may include a plurality of power cells electrically connected in parallel and one or more fixating cells oppositely polarized to the power cells that assist in suppressing energy decay of the HCEESDs. An electric locomotive that includes multiple energy banks of HCEESDs configured to independently provide electrical energy to the electric locomotive, which may be a maglev vehicle designed to operate on special tracks with electromagnets inductively polarized using electrical power from on-board HCEESDs, is also disclosed.

17 Claims, 6 Drawing Sheets

(56) References Cited

U.S. PATENT DOCUMENTS

| | | | | |
|---|---|---|---|---|
| 2008/0211457 | A1* | 9/2008 | Rudorff | H02J 7/0016 |
| | | | | 320/118 |
| 2009/0123823 | A1* | 5/2009 | Ando | H01M 4/485 |
| | | | | 429/129 |
| 2009/0161296 | A1* | 6/2009 | Matsui | H01G 9/038 |
| | | | | 361/505 |
| 2010/0159356 | A1* | 6/2010 | Mahoney | C04B 35/482 |
| | | | | 429/495 |
| 2010/0327819 | A1* | 12/2010 | Macdougall | H01G 9/155 |
| | | | | 320/166 |
| 2011/0085283 | A1* | 4/2011 | Park | H01G 9/016 |
| | | | | 361/502 |
| 2011/0170233 | A1* | 7/2011 | Lee | H01G 9/016 |
| | | | | 361/502 |
| 2011/0210701 | A1* | 9/2011 | Nakamura | H01M 10/441 |
| | | | | 320/118 |
| 2011/0286148 | A1* | 11/2011 | Lee | H01G 9/016 |
| | | | | 361/502 |
| 2012/0169270 | A1* | 7/2012 | Cho | H01M 10/441 |
| | | | | 320/101 |
| 2012/0282495 | A1* | 11/2012 | Kise | H01M 4/131 |
| | | | | 429/7 |
| 2012/0328916 | A1* | 12/2012 | Enning | H01M 2/1077 |
| | | | | 429/72 |
| 2013/0044017 | A1* | 2/2013 | Matsuzawa | H03M 1/165 |
| | | | | 341/136 |
| 2017/0365595 | A1* | 12/2017 | He | H01L 27/0255 |

* cited by examiner

HIGH-CAPACITY ELECTRICAL ENERGY STORAGE DEVICE FOR USE IN ELECTRIC AND HYBRID ELECTRIC VEHICLES

RELATED APPLICATION(S)

This application is a continuation of U.S. Utility patent application Ser. No. 14/082,141, filed on Nov. 16, 2013, entitled "HIGH CAPACITY ELECTRICAL ENERGY STORAGE DEVICE," by inventor Prakash Achrekar, and issued as U.S. patent Ser. No. 10/319,536 on Jun. 11, 2019, which utility patent application claims priority of U.S. Provisional Patent Application Ser. No. 61/796,719, filed on Nov. 19, 2012, entitled "HIGH CAPACITY ELECTRICAL ENERGY STORAGE DEVICE," by inventor Prakash Achrekar, which applications are incorporated herein in their entireties by this reference.

BACKGROUND OF THE INVENTION

1. Field of the Invention

The invention is related generally to high-capacity electrical energy storage devices, and more particularly, to electrical energy storage devices comprising high surface area capacitors that are suitable for use in electric and hybrid electric vehicles.

2. Related Art

A capacitor is a well-known electrical component that is capable of storing electrical energy. Generally, capacitors may be classified as conventional electrostatic capacitors, electrolytic capacitors, or electrolytic double-layer capacitors. Because the electrical energy is stored physically, with no chemical or phase changes taking place as occurs in conventional low-voltage lead-acid batteries, the process is highly reversible, and the discharge-charge cycle of a capacitor can be repeated over and over again, virtually without limit.

Capacitors are widely used in electronics for blocking direct current (DC) and passing alternating current (AC), and as signal filters, power sources, and the like. Generally, a capacitor comprises a pair of conductors that are separated by a dielectric region or material. Some capacitors may be "air" capacitors with no dielectric material. When a voltage is applied across the conductors, an electric field is generated in the conductors that stores energy. Recently, capacitors have been utilized as a supplement to conventional batteries or as accumulators that act as an energy storage device.

To serve as an energy storage device, a capacitor ideally possesses a high capacitance (where the unit of capacitance is the farad (F)). Conventional electrostatic capacitors with a high specific capacitance utilizing solid dielectrics are well known. For example, capacitors using barium titanate (BaTiO$_3$) have a large permittivity of the dielectric material on the order of $\varepsilon > 1000$ and specific capacitance of approximately 0.3 F/cm$^3$. Electrolytic capacitors have a higher capacitance per unit volume but with performance disadvantages such as reliability issues related to the electrolyte selected.

As for the electrolytic double layer capacitor (also referred to as supercapacitors or ultracapacitors), these types of capacitors store an electrical charge in a double layer at the interface formed between a high-surface-area carbon electrode and an electrolyte solution. The specific capacity of such capacitors is on the order of 2-46 F/cm$^3$ at the maximal specific energy (the amount of energy stored per unit of mass) up to 0.045 megajoules per kilogram (MJ/kg). Unfortunately, the electrolytic double layer principle utilized by these types of capacitors usually breaks down at voltages above approximately 5 volts. Such low voltage thus requires stacking many of these capacitors in series, which considerably reduces their total capacitance, thereby reducing their charge storage potential.

Thus, a primary disadvantage of all types of capacitors relative to conventional batteries is their low energy densities and low maximum voltages. Of course, combining banks of capacitors in series and in parallel can overcome these disadvantages, but then the resultant systems may be too bulky and heavy (i.e., less energy storage/unit volume or weight) making them impractical as replacements for batteries. Another disadvantage is the capacitor's high self-discharge or leakage, i.e., the capacitor cannot store energy for as long as a conventional battery. The newer class of supercapacitors charge and discharge rapidly and may have an equivalent series resistance (ESR) of less than 1 ohm, but a maximum voltage of 5.2V or less. They are available in much larger capacities, such as 300 F or greater. They may be used to supply the massive surge current required to get a large electric motor started or to store energy in hybrid electric vehicles generated under braking or when excess torque is produced by an internal combustion engine (ICE) or to frequently start engines in start-stop systems intended to deliver fuel savings and reduce emissions. However, because supercapacitors tend to have significantly higher self-discharge rates, they cannot store energy for as long as a conventional battery and thus they present some disadvantages and hence are not presently used in electric vehicles or hybrid electric vehicles as energy storage devices.

With respect to hybrid electric vehicles (HEV), capacitors are used primarily as an auxiliary power source for an ICE, which may be a gasoline or diesel engine, and as one example, these capacitors may be supercapacitor modules for automotive use that provide regenerative energy capture during braking/coasting (where conventional batteries are not suitable because of low charging rates) and use the recaptured energy to accelerate the vehicle and then cruise or start the engine frequently in a start-stop system.

As for electric vehicles (EV), these are embodiments where batteries are the prime mover of a vehicle without the use of other energy sources such as diesel engines, gas turbines or fuel cells. In general, the EV is powered entirely by electricity, which may be from overhead lines, a third rail, or on-board energy storage such as lithium-ion or nickel-metal hydride batteries. Electric locomotives, which are self-powered vehicles used for pulling trains of passenger or freight cars along railroad tracks, benefit from the high efficiency of electric motors, are quiet compared to diesel locomotives, and have a higher power output than diesel locomotives. However, the problem with many electric locomotives is that the electricity is usually delivered by overhead lines (often called "catenaries") or a third rail that requires costly infrastructure including substations and control systems that add weight and complexity to the electric locomotive. Therefore, it is highly desirable to develop electric locomotives that are able to travel long distances entirely without the use of catenaries or third rails.

Another example of an electric vehicle is a magnetic levitation (maglev) train, where magnetized coils running along a maglev track (or guideway) allows the maglev train to levitate (or float) above the maglev track through the use of repelling magnets. Once the train is levitated, power is supplied to the coils within the guideway walls to create a system of magnetic fields that pull and push the train along the guideway. In an example of a maglev train utilizing a high-capacity electrical energy storage device in accordance with the present disclosure, a plurality of energy banks of high-capacity electrical energy storage devices ("HCEESDs") may be placed on board the maglev train to supply the electrical energy required to inductively polarize electromagnets on the undercarriage of the maglev train to levitate it above the guideway, which reduces the expense of building the maglev transportation system (which is considerably more expensive than building conventional rail systems).

In view of the foregoing, there is an ongoing need for providing improved capacitors having a higher energy density and maximum voltage, as well as reduced self-discharge, to be used in HEVs or EVs without overhead lines or third rails.

SUMMARY

To address the foregoing problems, in whole or in part, and/or other problems that may have been observed by persons skilled in the art, the present disclosure provides systems, apparatus, instruments, devices, methods, and/or processes, as described by way of example in implementations set forth below.

A high-capacity energy storage device (or system) including at least one capacitor having a pair of high-voltage main power terminals and a pair of fixating auxiliary power terminals is disclosed, where electric energy is supplied to the at least one capacitor through the high-voltage main power terminals by a main power source that generates the electrical energy that is stored in the capacitor. The high-capacity energy storage device may also include a secondary low-voltage potential providing an amplified high voltage to the electrodes of the capacitor through the fixating auxiliary power terminals that causes the stored electrical energy to be retained in the at least one capacitor so long as the secondary low-voltage potential remains active.

The high-capacity electrical energy storage device may be an apparatus including a capacitor that includes an anode electrode (positive) and a cathode electrode (negative) and a dielectric material positioned between the anode electrode and the cathode electrode. In a method of operation a main power source provides electrical energy to the high-capacity electrical energy storage device to be stored therein through a pair of high-voltage main power terminals to the anode electrode and the cathode electrode, and an auxiliary power source applies a high voltage potential as a fixating electrical voltage through a pair of fixating auxiliary power terminals to the anode electrode and the cathode electrode of the high-capacity energy storage device.

A high-capacity electrical energy storage device in accordance with the present disclosure that may be utilized in a gasoline-electric hybrid vehicle is disclosed. The hybrid electric vehicle may include an internal combustion engine (ICE) powered by fuel (gasoline, liquid natural gas (LNG), compressed natural gas (CNG), or diesel) in a tank, an electric motor powered by a high-voltage battery pack, a controller for power and battery management, and a low-voltage conventional auxiliary battery. This hybrid electric vehicle may also include a recoverable energy storage system (RESS), which recovers kinetic energy during operation of the hybrid motor vehicle, e.g., during braking, and a high-capacity electrical energy storage device in accordance with the invention, which stores the recovered energy for later use as determined by the user of the hybrid motor vehicle or by a controller in the hybrid electric vehicle.

Also disclosed is a plurality of high-capacity electrical energy storage devices in accordance with the invention arranged in several banks positioned in an electric locomotive, where the electrical energy stored in the several banks of high-capacity energy storage devices is sufficient to power the electric locomotive from a starting point to a desired end point entirely with the stored electrical energy and without any additional external electrical energy from overhead lines or a third rail.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figure(s). The components in the figures are not to scale, emphasis instead being placed upon illustrating the principles of the invention. In the figures, like reference numerals designate corresponding parts throughout the different views.

DETAILED DESCRIPTION

Figure 1:
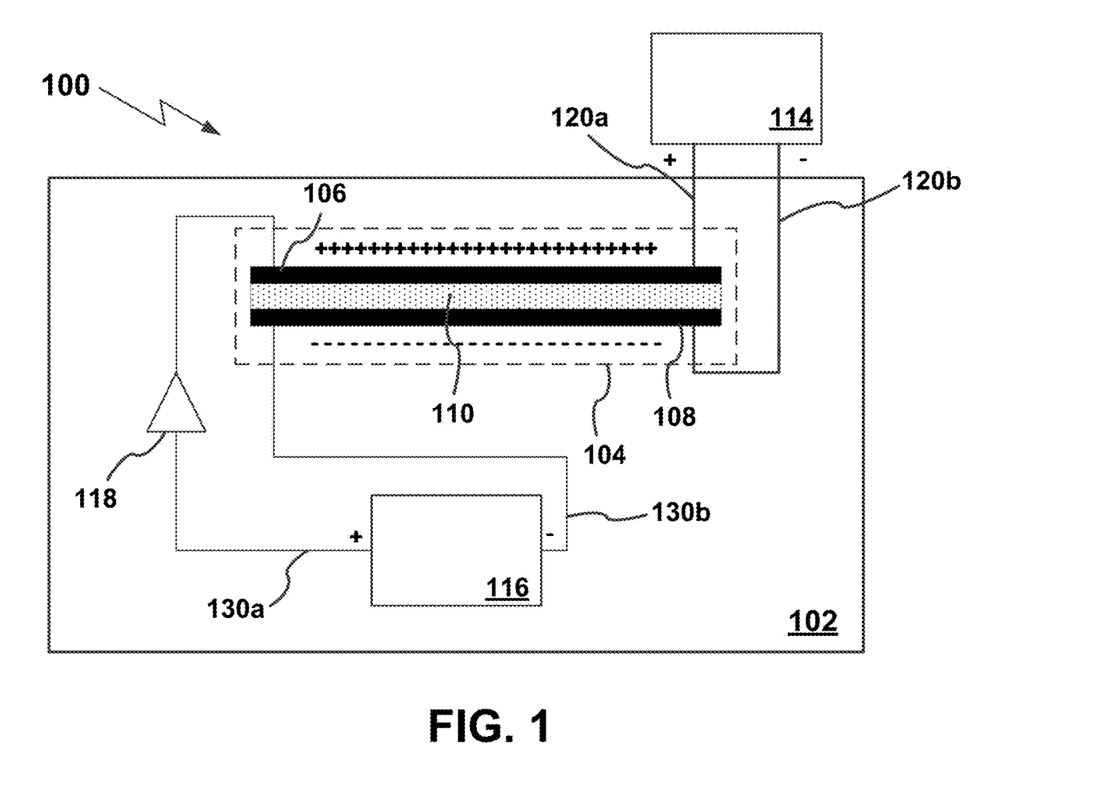
FIG. 1 shows a block diagram of an example of an implementation of a high-capacity electrical energy storage device in accordance with the invention having a single cell.

With reference to FIG. 1, a block diagram 100 of an example of an embodiment of a high-capacity electrical energy storage device ("HCEESD") 102 is depicted. The HCEESD 102 may include a capacitor that includes an anode electrode (positively charged) 106, a cathode electrode (negatively charged) 108, with the anode electrode 106 and the cathode electrode 108 separated by a dielectric material 110. During charging, main power source 114 supplies the electrical energy to be stored in the capacitor 104 by way of a pair of high-voltage power terminals 120a and 120b connected to the anode electrode 106 and the cathode electrode 108, respectively, and may take various forms based on the embodiment utilizing HCEESD 102.

In other implementations of the HCEESD 102, the capacitor 104 may be replaced by a series/parallel bank that includes a plurality of electric double-layer capacitors, or a series/parallel bank that includes a plurality of electrolytic capacitors (see, e.g., FIGS. 2 and 3), with each cell of these capacitors including an anode electrode (positively charged) and a cathode electrode (negatively charged), with the anode electrode and the cathode electrode separated by a dielectric material.

A fixating electrical voltage is applied to a pair of fixating auxiliary power terminals 130a and 130b on the anode electrode 106 and the cathode electrode 108, respectively, by the auxiliary power source 116 connected in parallel with the capacitor 104, with the fixating electrical charge being applied so long as the auxiliary power source 116 remains active. The auxiliary power source 116 may be a conventional 12V automotive battery. The auxiliary power source 116 may include an amplifier (not shown) that amplifies a lower voltage, e.g., 12 volts, to a higher operational voltage that matches the desired output voltage of the HCEESD 102. In this example, diode 118, or any other form of electronics that prevents any reverse current flow from the HCEESD 102 into the low voltage auxiliary power source 116, may be utilized to prevent damage to the auxiliary power source 116.

By applying the amplified fixating voltage to the capacitor 104, the HCEESD 102 will retain its stored electrical charge so long as this amplified fixating voltage remains applied, thus significantly extending the time during which the stored electrical charge will be maintained within the HCEESD 102 before self-discharging.

Figure 2:
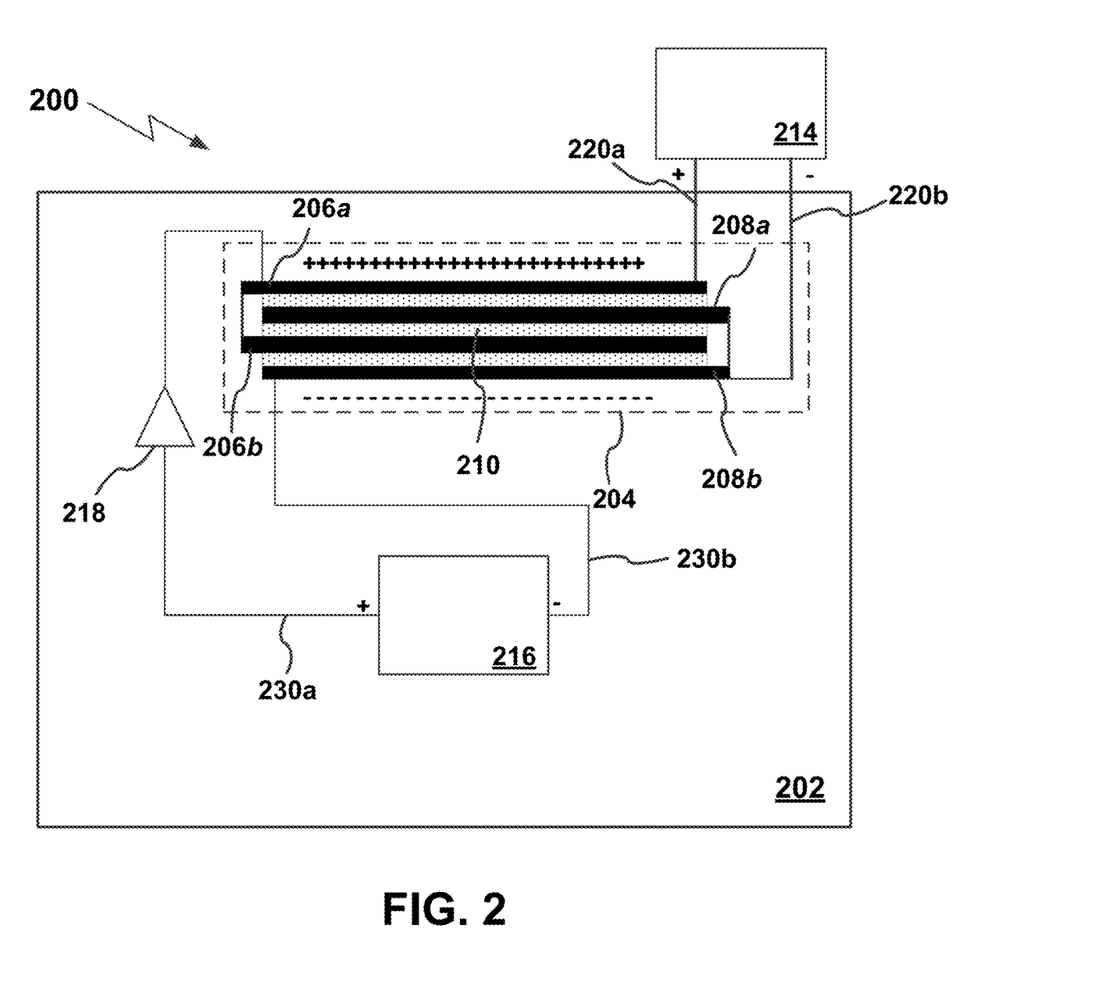
FIG. 2 shows a block diagram of an example of an implementation of a high-capacity electrical energy storage device in accordance with the invention having three cells.

Turning to FIG. 2, a block diagram 200 of another example of an implementation of a HCEESD 202 is shown. The HCEESD 202 may include a capacitor 204, including two pairs of anode electrodes (positively charged) 206a and 206b and cathode electrodes (negatively charged) 208a and 208b, forming three parallel cells. In this example embodiment, these three cells are formed by anode electrode 206a and cathode electrode 206b separated by dielectric material 210 and anode electrode 208a and cathode 208b separated by dielectric material 210.

During charging, coupled to the capacitor 204 by way of a pair of high-voltage power terminals 220a and 220b connected to the anode electrode 206 and the cathode electrode 208, respectively, may be an external power source 214. The external power source 214 supplies the energy to be stored in the capacitor 204 and may take various forms based on the type of embodiment utilizing HCEESD 202. During operation, external power source 214 represents an electric motor load powered by the stored electrical energy from the HCEESD 202.

Figure 3:
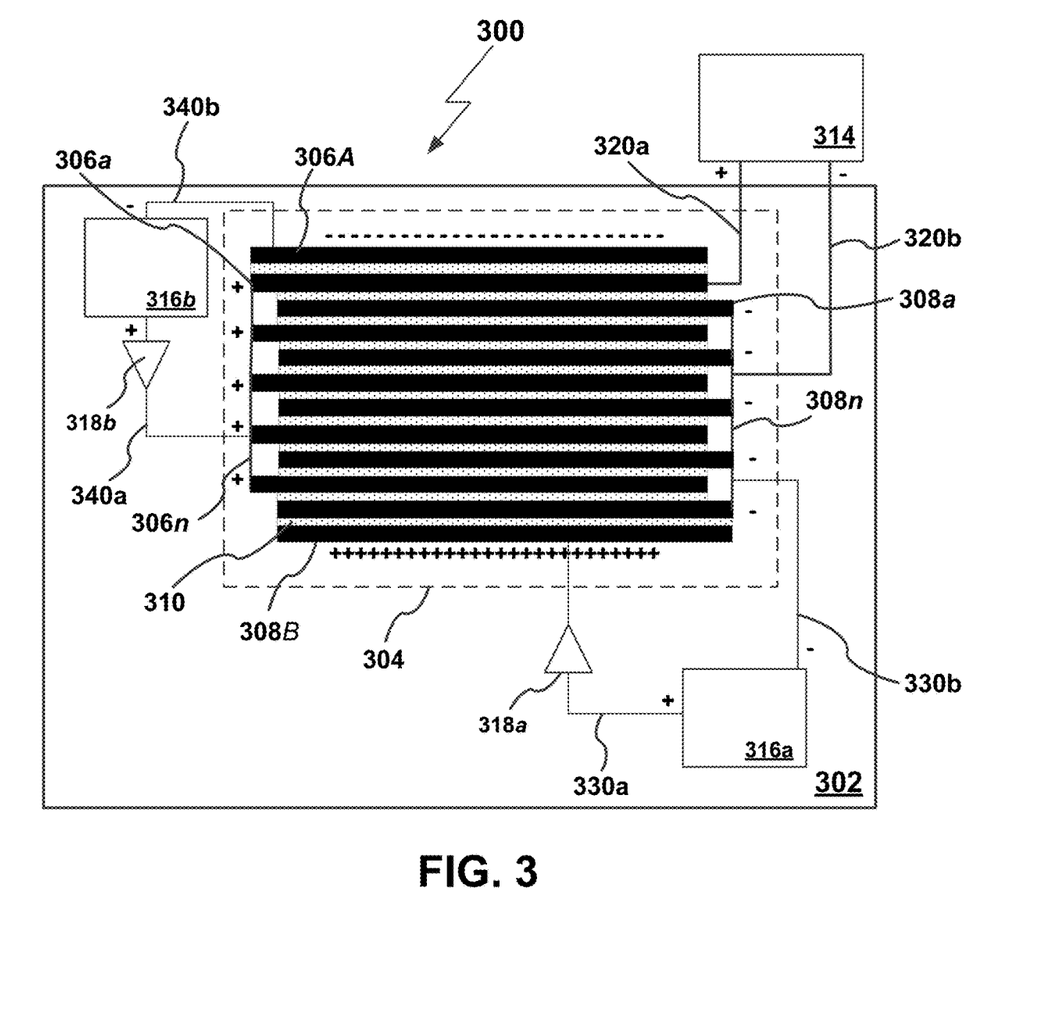
FIG. 3 shows a block diagram of an example of an implementation of a high-capacity electrical energy storage device in accordance with the invention having n-numbered cells.

FIG. 3 shows a block diagram 300 of another example of an embodiment of a HCEESD 302 having multiple power cells. The HCEESD 302 includes a capacitor 304, including multiple pairs of anode electrodes (positively charged) 306a-306n and cathode electrodes (negatively charged) 308a-308n, which are electrically connected in parallel and which in this example produce nine parallel cells each formed by a pair of anode electrodes 306a-306n and cathode electrodes 308a-308n separated by dielectric 310. It will be understood and appreciated by those skilled in the art that n pairs of anode electrodes and cathode electrodes may be utilized in other embodiments, where the number n may vary as required by the desired voltage and power density of HCEESD 302, and that n pairs of anode electrodes and cathode electrodes, with each pair separated by dielectric material 310, will produce $((n-1)\times 2)+1$ power cells configured to store electrical energy in an HCEESD (where n>1).

Coupled to the capacitor 304 by way of a pair of high-voltage power terminals 320a and 320b electrically connected to anode electrodes 306a and 306n and cathode electrodes 308a and 308n, respectively, may be a main power source 314. During operation, main power source 314 represents the electric motor load powered by the stored electrical energy from the HCEESD 302. A fixating electrical charge voltage may be applied to a pair of fixating auxiliary power terminals 340a and 340b that are electrically connected to anode electrode 306a and cathode electrode 306A, respectively, from the auxiliary power source 316b, and to a pair of fixating auxiliary power terminals 330a and 330b that are electrically connected to cathode electrode 308B and anode electrode 308a, respectively, from the auxiliary power source 316a, with the fixating electrical charges being retained so long as the auxiliary power sources 316a and 316b remain active. These fixating voltages are applied to cells that are not part of the HCEESD 302 that stores and provides electrical power, as they are opposite in polarity to the power cells of the HCEESD 302 and are intended to suppress energy decay of HCEESD 302.

Thus in FIG. 3, there are two fixating cells, one comprising cathode electrode 308a and anode electrode 308n separated by dielectric material 310, and the other comprising cathode electrode 306A and anode electrode 306a separated by dielectric material 310, where both fixating cells are opposite in polarity to the power cells of HCEESD 302. While FIGS. 1 and 2 both show a single auxiliary power source electrically connected to a HCEESD, in the case of an embodiment of a HCEESD with multiple power cells that has a higher voltage and energy capacity, such as the embodiment shown in FIG. 3, there is a greater need to suppress energy decay of the HCEESD 302. Thus, there are two separate fixating cells, one on the top and one on the bottom of HCEESD 302 shown in FIG. 3 to avoid short circuiting.

The low-voltage auxiliary power sources 316a and 316b may be a conventional lead-acid 12V automotive battery. The auxiliary power sources 316a and 316b may each include an amplifier (not shown) that amplifies a lower voltage, e.g., 12 volts, to a higher operational voltage that matches the desired output voltage of the HCEESD 302. In this example, diodes 318a and 318b or any other form of electronics that prevents any reverse current flow from the HCEESD 302 into the fixating auxiliary power sources may be utilized to prevent damage to the secondary power sources 316a and 316b, respectively.

Figure 4:
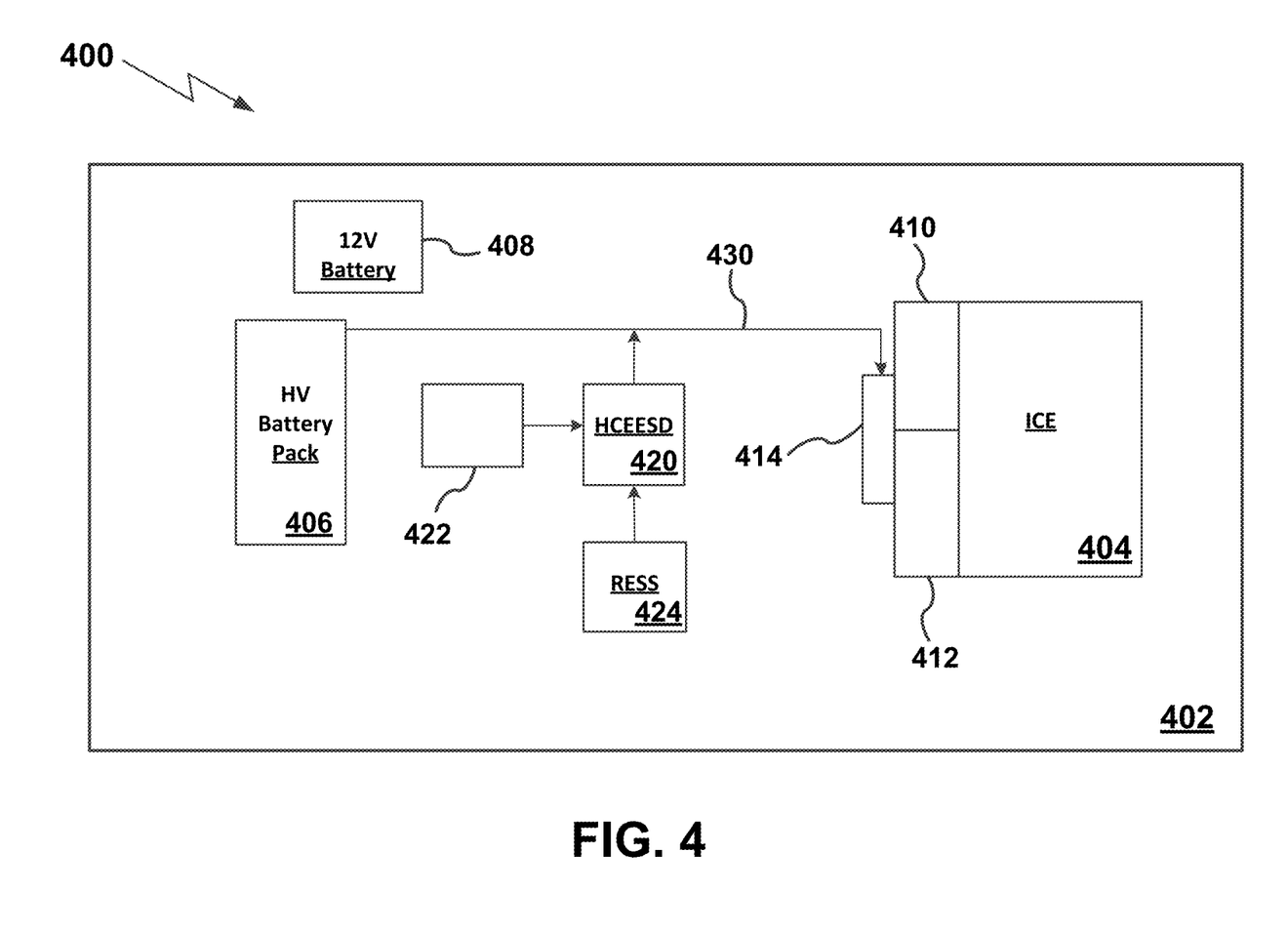
FIG. 4 shows a block diagram of an implementation of an electric hybrid motor vehicle having an internal combustion engine (ICE), a high-voltage hybrid vehicle (HV) battery pack, an auxiliary battery, and a high-capacity electrical energy storage device in accordance with the invention.

FIG. 4 shows a high-level block diagram 400 of a gasoline-electric hybrid motor vehicle 402 that utilizes a HCEESD 420 according to an embodiment of the present disclosure. The gasoline-electric hybrid motor vehicle 402 typically includes an internal combustion engine (ICE) 404, a high-voltage hybrid vehicle (HV) battery pack 406, a low-voltage conventional lead-acid battery 408, an electric motor 410, an electric generator 412, and an inverter 414. In operation, power cables 430 carry high-voltage direct current (DC) from HV battery pack 406 to inverter 414, where the DC voltage may be converted to alternating current (AC) to drive electric motor 410. Electric motor 410 may be contained in a transaxle (not shown) of gasoline-electric hybrid motor vehicle 402 in order to power this vehicle. Also, inverter 414 may be configured to convert AC from electric motor 410 to DC to recharge HV battery pack 406.

Gasoline-electric hybrid motor vehicle 402 may also include HCEESD 420, in accordance with the present disclosure, and an auxiliary power source 422 that supplies a fixating electrical charge to fixating auxiliary power terminals of high-capacity electrical energy storage device 420 to retain its charge. In other embodiments, the secondary power source 422 may be supplied power from the low-voltage conventional lead-acid battery 408.

Electrical energy may be supplied by the HCEESD 420 replacing HV battery pack 406. Alternatively, the electrical energy stored by HCEESD 420 may be used in tandem with the HV battery pack 406. Recovered braking energy captured by recoverable energy storage system (RESS) 424, which may be, as an example, a variable-voltage alternator that converts kinetic energy to electric power that in turn may be stored in HCEESD 420.

In the gasoline-electric hybrid motor vehicle 402, use of the HCEESD 420 may have several advantages. First, in many regenerative energy capture systems, the charging current produced during braking/coasting may be too large for a conventional battery to accept but can be accepted by a high-capacity electrical energy storage device. Second, stop-start systems are being utilized in hybrid vehicles to reduce fuel consumption and vehicle emissions, and the rapid and repeated starting and stopping of the vehicle cannot be provided by conventional batteries as well as by supercapacitors because of the latter's significantly faster charge and discharge times. Additionally, a high-capacity electrical energy storage device, according to an embodiment of the present disclosure, is able to retain its charge over an extended period of time, thus providing better engine starting and sustaining capabilities.

Figure 5A:
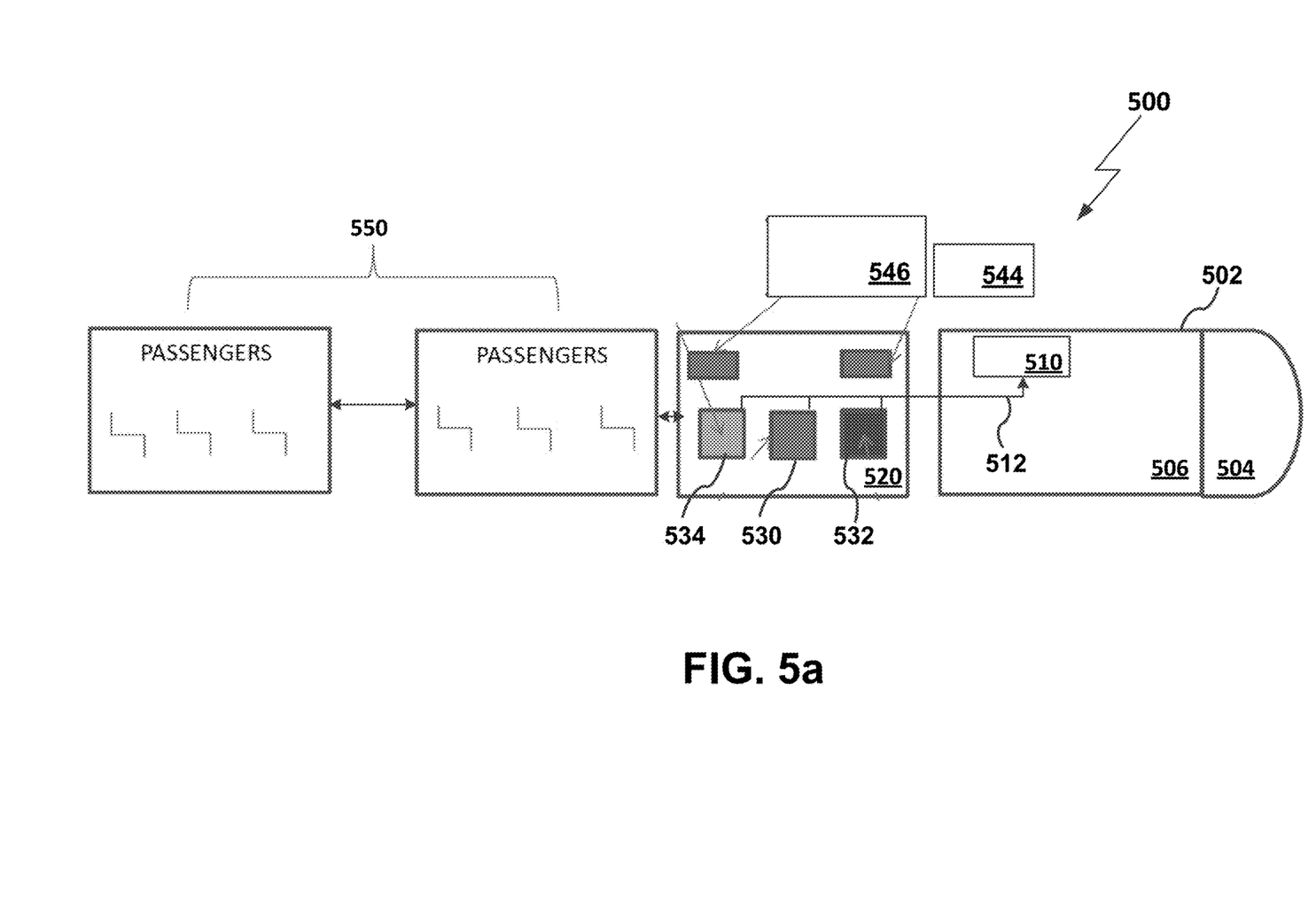
FIG. 5a shows a block diagram of an implementation of an electric locomotive having a plurality of high-capacity electrical energy storage devices in accordance with the invention arranged in a plurality of interconnected energy banks as its entire main energy source.

FIG. 5a shows a block diagram of an example of an embodiment of an electric locomotive 500 having a plurality of high-capacity electrical energy storage devices HCEESDs) according to an embodiment of the present disclosure arranged as a plurality of interconnected energy banks as its entire main power source. Electric locomotive 500 comprises a cab 504, which is the area occupied by an engineer who operates the electric locomotive 500. Accessory compartment 506 is that portion of electric locomotive 500 that may contain transformers, rectifiers, inverters, batteries, 3-phase AC motors, cooling fans, controllers, accessories, instruments, and other components, etc. Included within these accessories and components are 3-phase AC motors 510 that provide AC power to the wheels of electric locomotive 500.

Power compartment 520 contains a plurality of energy banks of HCEESDs 530, 532, 534 that are each independently electrically connected by means of power cables 512 that provide power to the 3-phase AC motors 510, where HCEESDs 530 represent a HCEESD currently in use, HCEESDs 532 represent HCEESDs available for subsequent use, and HCEESDs 534 represent HCEESDs already used. Auxiliary batteries 544 supply low-voltage auxiliary power to fixating auxiliary power terminals (not shown) of each of the HCEESDs of power compartment 520. Power compartment 520 also contains switching circuitry 546 that is in signal communication with each of the HCEESDs of power compartment 520 with the assistance of a controller (not shown) in the accessory compartment 506, and in a method of operation selects an HCEESD to provide electrical energy to the 3-phase AC motors 510. When that HCEESD runs out of electrical energy, another energy bank of the HCEESDs is selected to provide electrical energy to electric locomotive 500, for example, from HCEESDs 532. Also shown in FIG. 5a are passenger cars 550, which may be pulled by electric locomotive 500; also included within passenger cars 550 may be freight cars, tankers and the like.

In a method of operation, any one of the HCEESDs of power compartment 520 of electric locomotive 500 is initially available to supply electrical energy to the 3-phase AC motors 510 of electric locomotive 500. As an example, electric locomotive 500 may begin operation using HCEESD 530 as its energy source. When all the electrical energy of HCEESD 530 has been used up, a controller (not shown) will select another HCEESD to provide electric energy to the 3-phase AC motors 510. HCEESDs 534 represent banks of HCEESDs already used and no longer available to provide electrical energy (until recharged again), while HCEESDs 532 represent banks of HCEESDs available for future use.

Figure 5B:
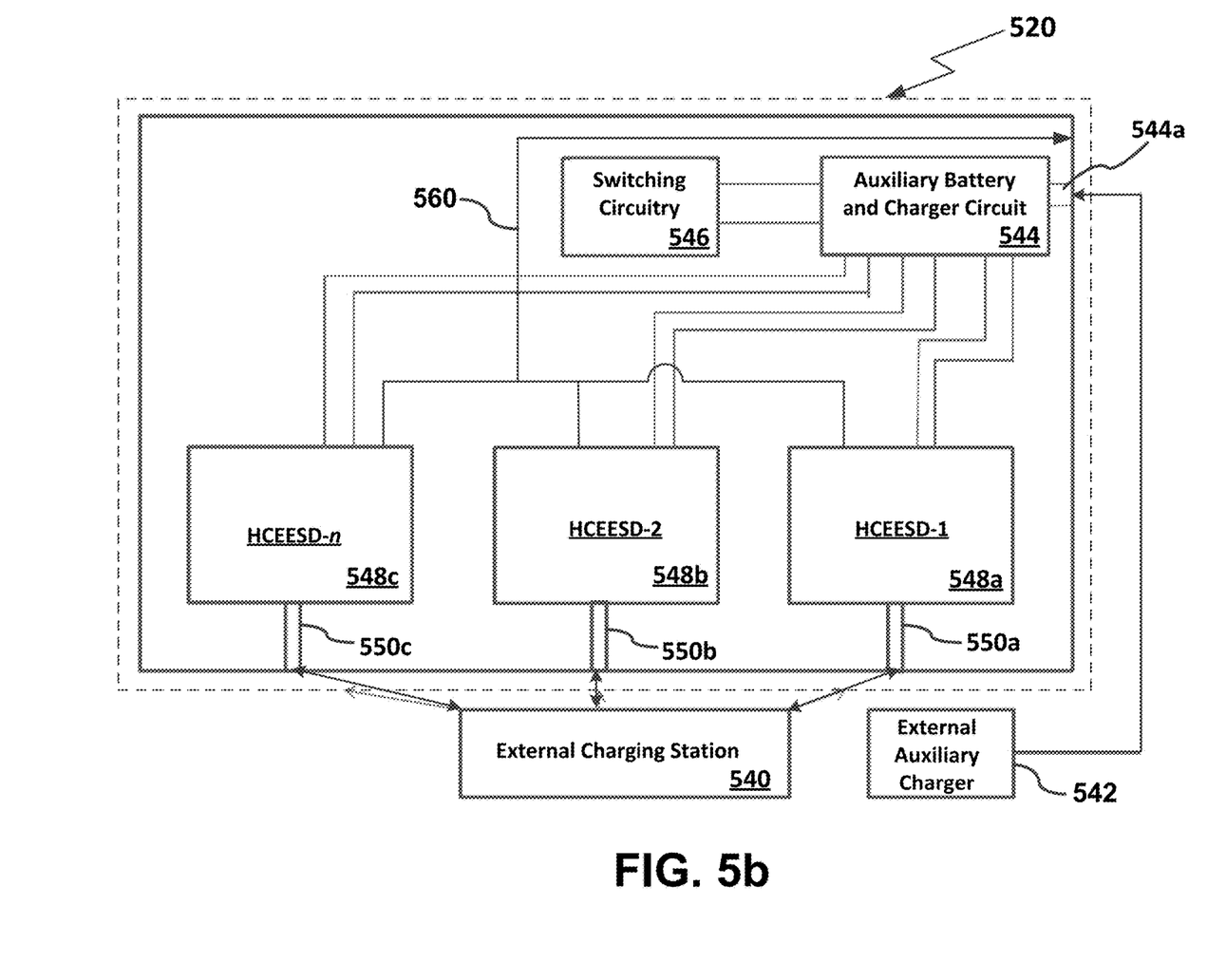
FIG. 5b shows a block diagram of an implementation of a power compartment comprising a plurality of blocks each containing a plurality of high-capacity electrical energy storage devices in accordance with the invention that provide electrical energy to the electric locomotive of FIG. 5A.

Turning to FIG. 5b, a high-level block diagram of an example of an embodiment of a power compartment 520 comprising a plurality of energy banks each containing a HCEESD in accordance with the present disclosure that provide electrical energy to the electric locomotive of FIG. 5a is shown. Power compartment 520 contains multiple energy banks of HCEESDs that are connected and provide power to the 3-phase AC motors 510, FIG. 5a, by means of power cables 560. External to power compartment 520 are external charging station 540 and external auxiliary charger 542, which provide high-voltage main power to high-voltage main power terminals (not shown) of the HCEESDs and fixating auxiliary power terminals (not shown) of the HCEESDs, respectively, from external power sources. Main electrical power may be provided to HCEESD-1 548a, HCEESD-2 548b, and HCEESD-3 548c, through power receptacles 550a, 550b, and 550c, respectively. In this embodiment, external auxiliary charger 542 may provide a fixating electrical voltage to auxiliary battery and charger circuit 544 through auxiliary power receptacle 544a, which in turn may charge fixating auxiliary power terminals (not shown) of the HCEESDs. Because these power sources are external to the power compartment 520, charging of the HCEESDs may take place at a terminus of the routes that the electric locomotive 500 travels, or along the route the electric locomotive 500 travels, if, for example, people spend time getting on and off the electric locomotive as it makes stops along the route.

In FIG. 5b, HCEESDs 548a, 548b, and 548c represent n energy banks of HCEESDs that provide electrical energy to the 3-phase AC motors 510, FIG. 5a, of electric locomotive 500 by power cables 560, which may be electrically connected to power compartment 502 (not shown). The number n of the available energy banks is determined by the loads to be carried by the electric locomotive 500, the length of the routes to be travelled, and the dimensions of the HCEESDs included in the energy banks. The transfer of electric power from the HCEESDs is controlled by switching circuitry 546 as directed by a controller (not shown) in the electric locomotive 500, which in general selects and deselects which of the n energy banks will supply electrical energy to the electric locomotive 500.

In general, the high-capacity electrical energy storage devices shown in FIGS. 1-3 may be used as replacements for conventional batteries and accumulators, or as supplements thereto. For example, the high-capacity electrical energy storage devices may be used in all manner of motor vehicles, such as electric or hybrid electric automobiles, hybrid or electric mass transport vehicles, as well as smaller motor vehicles, such as golf carts and lawn mowers. The high-capacity electrical energy storage devices may also be used in portable devices, such as computers and other hand-held devices. In essence, one skilled in the art will recognize that the high-capacity electrical energy storage device in one form or another may be utilized to replace conventional battery packs however they may be used.

As for the high-capacity electrical energy storage device itself, its design may vary with differing applications. For example, the high-capacity electrical energy storage device can be tailored by varying the surface area of electrodes, the type of dielectric material, and the thickness of the dielectric, material of construction, etc. Furthermore, because the various implementations are not limited by the electrolyte dissociation inherent in conventional electrolytic capacitors and supercapacitors, these implementations can be charged at significantly higher voltages based on the thickness and type of the dielectric used. Voltages for storing an electrical charge using these techniques can be over a very broad range.

A plethora of materials could be used for making the device. Such materials may include, for example, copper, nickel, stainless steels, carbon, silver, gold, conductive ceramics, nanostructured materials, etc. The high-capacity electrical storage device, as well as its capacitors, may also employ different shapes, such as cubes, ellipses, conductive wire mesh, sponge, cylinders, uneven fragments of crushed conductive media, spikes, etc.

In each implementation, the thickness of the dielectric layer may be relatively uniform without any pores and relatively thin. A variety of dielectric materials are readily available, such as ceramics, glass, plastics, and oxides of several metals that can be used for the intended application. The thickness of the dielectric layer may be between 0.000001 mm to several centimeters, depending on the application, the desired voltage and power, storage capacity, ease of fabrication, etc. The thickness of the dielectric coating may vary based on a number of factors. For example, a thinner dielectric coating allows for a higher charge storage capacity, but a lower breakdown voltage. In some embodiments, the dielectric coating may be sintered in situ.

An estimate of the storage capacity of an example of an embodiment of a high-capacity electrical energy storage device in accordance with the present disclosure (HCEESD) may be calculated as follows. In this example, each HCEESD of the type shown in FIGS. 2 and 3 may have dimensions 1 meter (m)×1 m×0.25 m, which provides an HCEESD with a volume of 1 m×1 m×0.25 m (or 0.25 m³). A power cell of the HCEESD comprises two electrodes, with one copper of 0.5 mm thickness for each electrode. Each electrode has a 1 mm carbon coating with a particle size of 0.01 micron (μm) particles (=0.00000001 m diameter=$10^{-8}$ m).

As an example, using activated carbon, the surface area of each 0.01 μm particle (carbon sphere=$\pi \times d^2$=3.1417× $0.00000001^2$)=$3.1417 \times 10^{-16}$ m²). There are approximately 25 million layers of carbon particles of 0.00000001 m in the 0.25 m thickness of the 1 m² square electrode. Each cell has four electrode copper plates each with a thickness of 0.0005 m; the distance between copper plates is 0.0001 m; and there 100,000 particle layers of 0.001 m each with each copper plate coated with 1 mm of carbon particles, giving a total thickness of 0.0031 m. Thus, in a thickness of 0.25 m, there are approximately 80 units (0.25 m/0.0031 m) with four plates each or 320 plates.

Other parameters of this example may be:
The thickness of the dielectric $BaTiO_3$=0.1 mm between opposing electrodes, with permittivity $\varepsilon$=$8.854 \times 10^{-12}$;
The dielectric constant (k) of $BaTiO_3$=1200; and Charging voltage=250 volts for operating a 25 volt motor.
and
The surface area of copper electrodes=1 m×1 m=1 m².
Therefore, in this example, the total surface area=sphere surface area+plate surface area. Total surface area=$3.142 \times 10^6$ m² (neglecting plate area).

Capacitance = $k \times \varepsilon \times$ (Surface Area/Thickness of dielectric× plates);

= $8.854 \times 10^{-12} \times 1200 \times (25,000,000/0.0001 \text{ m} \times 320)$;

= 849,984 Farads

Coulombs at one volt (1 Farad = 1 Coulomb).

Coulomb=0.00027778 Ampere-hours (Ah). Therefore, 849984 Coulombs=236.1 Ah. At 250 volts, this capacitance can be converted to an energy of 59 kWh, which would be sufficient to drive a Tesla-type automobile about 400 miles on a single charge.

A design for hybrid electric vehicles (such as Prius) could be used to boost mileage with a much smaller sized cell, say for example, a 1 m×1 m×0.1 m² bank. As for the electric locomotive, obviously higher capacities and voltages will be required, and this can be achieved by modifying the dimensions of the bank of cells. For example, the dimensions of the copper sheets can be changed, for example, to 1.5 m×1.5 m or 2.0 m×2.0 m, and the thickness of the bank of cells can be increased to 1.0 m or greater. Because it is intended that there will be multiple banks of cells in the electric locomotive, the number of these banks of cells will be a factor in determining the dimensions of each bank of cells.

Use of the phrase "configured to," in one embodiment, refers to arranging, putting together, manufacturing, importing and/or designing an apparatus, hardware, logic, module, or element to perform a designated or determined task. Thus, in the present disclosure, an apparatus or element thereof that is not operating is still "configured to" perform a designated task if it is designed, coupled, and/or interconnected to perform said designated task. Accordingly, use of the term "configured to" does not require operation, but instead focuses on the latent state of an apparatus, hardware, logic, module, and/or element, where in the latent state the apparatus, hardware, logic, module, and/or element is designed to perform a particular task when the respective apparatus, hardware, logic, module, and/or element is operating. It will also be understood that the term "in signal communication" as used in this disclosure means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of embodiments has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

What is claimed is:

1. A high-capacity electrical energy storage device ("HCEESD"), the HCEESD comprising:
a capacitor having at least one power cell comprising:
an anode electrode (positive);
a cathode electrode (negative); and
a dielectric material positioned between the anode electrode and the cathode electrode that separates the anode electrode and the cathode electrode,
a pair of high-voltage main power terminals; and
a pair of fixating auxiliary power terminals;
wherein, during charging of the HCEESD, a main power source is electrically connected to the pair of high-voltage main power terminals that are configured to receive electrical energy from the main power source and store electrical energy in the HCEESD; and
wherein the pair of fixating auxiliary power terminals are configured to receive from an auxiliary power source a fixating electrical voltage that facilitates the HCEESD to retain its stored electrical energy so long as the fixating electrical voltage is applied to the HCEESD.

2. The HCEESD of claim 1, where the auxiliary power source includes an amplifier configured to provide a voltage to the electrical energy provided by the fixating auxiliary power source that is equal to that of the electrical energy supplied by the main power source.

3. The HCEESD of claim 1, where the at least one capacitor comprises a plurality of power cells electrically connected in parallel.

4. The HCEESD of claim 1, where the main power source is a power source located externally to a vehicle in which the HCEESD is placed.

5. The HCEESD of claim 3, where the anode electrode and the cathode electrode of the capacitors of the HCEESD are manufactured from a material selected from a group consisting of activated carbon, carbon aerogel, xerogels, carbon nanotubes, carbon nano-fibers, and any other conductive media that can be produced with large surface area particles.

6. The HCEESD of claim 1, where the HCEESD is in the shape of a cube, a cylinder, a rectangular prism, a cone, or a pyramid.

7. The HCEESD of claim 1, wherein the pair of high-voltage main power terminals of the HCEESD are configured to discharge stored electrical energy from the HCEESD to an electric motor load.

8. The HCEESD of claim 3, where the HCEESD further comprises, in addition to the plurality of power cells electrically connected in parallel, a first fixating cell comprising an anode electrode (positive), a cathode electrode (negative), and a dielectric material positioned between the anode electrode (positive) and the cathode electrode (negative) that separates the anode electrode and the cathode electrode, wherein the first fixating cell is electrically connected in parallel with opposite polarity with the plurality of power cells and the anode electrode (positive) and the cathode electrode (negative) are electrically connected to the pair of fixating auxiliary power terminals.

9. The HCEESD of claim 8, where the HCEESD further comprises, in addition to the plurality of power cells electrically connected in parallel, a second fixating cell comprising an anode electrode (positive), a cathode electrode (negative), and a dielectric material positioned between the anode electrode (positive) and the cathode electrode (negative), wherein the second fixating cell is electrically connected in parallel with opposite polarity with the plurality of power cells and the anode electrode (positive) and the cathode electrode (negative) are electrically connected to the pair of high-voltage main power terminals.

10. A main power source for utilization by an electric vehicle, the main power source comprising:
a plurality of energy banks of high-capacity electrical energy storage devices ("HCEESDs"), wherein each of the HCEESDs comprises:
at least one power cell comprising:
an anode electrode (positive);
a cathode electrode (negative); and
a dielectric material positioned between the anode electrode and the cathode electrode;
a pair of high-voltage main power terminals; and
a pair of fixating auxiliary power terminals;
wherein the high-voltage main power terminals of the HCEESD are configured, when electrically connected to a power source external to the electric vehicle, to receive electrical energy from the power source and store that electrical energy in the HCEESD;
power cables coupled to each HCEESD of the plurality of banks of HCEESDs that are configured to transit electrical energy from each HCEESD to one or more electric motors that provide motive power to wheels of the electric vehicle;
a controller in signal communication with each HCEESD of the plurality of energy banks of HCEESDs wherein the controller is configured to activate and deactivate each bank as required to utilize all electrical energy stored in the plurality of banks of HCEESDs; and
a fixating auxiliary power source that provides a fixating electrical voltage to the pair of fixating auxiliary power terminals that facilitates the HCEESD to retain its stored electrical energy so long as the fixating electrical voltage is applied to the HCEESD.

11. The main power source for utilization by an electric vehicle of claim 10, where the electric vehicle is an electric locomotive or a magnetically levitated (maglev) locomotive designed to operate on special tracks with electromagnets of the maglev vehicle inductively polarized using electrical power from the plurality of energy banks of HCEESDs to levitate the maglev above the special tracks.

12. The main power source for utilization by an electric vehicle of claim 11, where each of the HCEESDs comprises a plurality of power cells electrically connected in parallel.

13. The main power source for utilization by an electric vehicle of claim 12, where each of the HCEESDs further comprises, in addition to the plurality of power cells electrically connected in parallel, a first fixating cell comprising an anode electrode (positive), a cathode electrode (negative), and a dielectric material positioned between the anode electrode (positive) and the cathode electrode (negative), wherein the first fixating cell is electrically connected in parallel with opposite polarity to the plurality of power cells and the anode electrode (positive) and the cathode electrode (negative) are electrically connected to the pair of auxiliary power terminals.

14. The main power source for utilization by an electric vehicle of claim 10, further comprising one or more power receptacles configured to be coupled to an external charging station configured to recharge the HCEESDs of the plurality of energy banks.

15. The main power source for utilization by an electric vehicle of claim 14, wherein the auxiliary power source is a conventional lead-acid 12V automotive battery.

16. The main power source for utilization by an electric vehicle of claim 15, further comprising a receptacle configured to be coupled to an auxiliary battery and charger circuit within the electric locomotive in order to recharge the conventional lead-acid 12V automotive battery.

17. The main power source for utilization by an electric vehicle of claim 13, wherein the controller comprises switching circuitry in signal communication with each HCEESD of the plurality of energy banks configured to measure the status of the electrical energy in each HCEESD, disconnect a HCEESD from the power cables when that HCEESD's stored electrical energy is depleted, and select and connect a HCEESD with stored electrical energy from the plurality of energy banks to the power cables when required.

* * * * *